United States Patent [19]

Decoster

[11] 4,348,756
[45] Sep. 7, 1982

[54] RECORD PLAYER CONTROL MECHANISM

[75] Inventor: Michel H. F. Decoster, Eindhoven, Netherlands

[73] Assignee: U.S. Philips Corporation, New York, N.Y.

[21] Appl. No.: 231,711

[22] Filed: Feb. 5, 1981

[30] Foreign Application Priority Data

Feb. 12, 1980 [NL] Netherlands ......................... 8000860

[51] Int. Cl.³ ............................................ G11B 17/06
[52] U.S. Cl. ..................................... 369/226; 369/216
[58] Field of Search ......................... 369/216, 225, 226

[56] References Cited

U.S. PATENT DOCUMENTS

3,240,498 3/1966 Grossenheider et al. ........... 369/206
3,342,499 9/1967 Fukuda et al. ...................... 369/207
3,848,875 11/1974 Miyoshi ............................... 369/203

Primary Examiner—Steven L. Stephan
Attorney, Agent, or Firm—David R. Treacy

[57] ABSTRACT

A record player having a turntable mounted for rotation on a frame; a pick-up arm spindle journalled to the frame, and having a pick-up arm and arm lever; and a control member for controlling movement of the pick-up arm in a first direction from the turntable and a second direction toward the turntable. A rod connected to the control member cooperates with a control element having a coupling portion for engaging the pick-up arm lever. Guides on the frame cause the coupling portion of the control element to move along first and second paths respectively during the first and second directions of pick-up arm movement, the paths being concentric with the axis of the pick-up arm spindle, and the coupling portion of the control element engaging the pick-up arm lever along the second path only.

11 Claims, 8 Drawing Figures

RECORD PLAYER CONTROL MECHANISM

BACKGROUND OF THE INVENTION

The invention relates to a record player having a frame on which a turntable is mounted for rotation and in which a pick-up arm spindle is journalled, which spindle is rigidly connected to a pick-up arm and to a pick-up arm lever, the frame also carrying a control member by which the pick-up arm can be controlled in a first direction of movement about the axis of the spindle away from the turntable and in a second direction of movement about the axis of the spindle towards the turntable, and which for this purpose is connected to a rod which co-operates with a control element. The control element comprises a coupling portion which, at least for controlling the pick-up arm in the second direction of movement, is engageable with a coupling portion of the pick-up arm lever.

A record player of this type is known from U.S. Pat. No. 3,342,499. In this known record player the control element is rotatable about the pick-up arm spindle under the influence of a control spring which is connected to the control element, by which rotation the pick-up arm is movable in the second direction from a rest position towards the turntable. If the pick-up arm of this known record player is moved in the first direction towards the rest position under the influence of the control member, the control spring of the control element is tensioned again. In order to prevent the pick-up arm, after having reached the rest position, from being moved again in the second direction, a locking mechanism ensures that the control element cannot rotate after the control spring has been tensioned. In order to enable the control element to be locked, some clearance is necessary between a catch provided on the control element and the locking mechanism.

After the pick-up arm has been returned to an end position through a movement in the first direction, the control element, after being locked, and thus the pick-up arm are slightly pivoted back under the influence of the control spring. Thus the pick-up arm is moved to the rest position with a detour, which results in loss of time and an unsteady movement of the pick-up arm. Further as a result of inaccurate adjustment or wear it is possible that the control element will not be locked correctly after tensioning of the control spring, so that the pick-up arm is again moved in the second direction from the rest position towards the turntable, which is undesirable.

SUMMARY OF THE INVENTION

It is the object of the invention to effect control of the pick-up arm of such a record player in such a way that the pick-up arm is moved to the rest position in a rapid and reliable manner.

According to the invention the frame carries guide means for the control element, which guide means, when the pick-up arm is controlled in the first or the second direction of movement, guide the coupling portion of the control element over a first and a second path respectively, which paths are substantially concentric with the axis of the pick-up arm spindle. The first path is situated at a greater radial distance from the axis than the second path, and the coupling portion of the control element is engageable with the coupling portion of the pick-up arm lever in the second path only. Thus, since during the pick-up arm movement in the first direction the coupling portion of the control element is situated in the first path, which is spaced from the second path, erroneous engagement of the coupling portions of the control element and the pick-up arm lever is not possible.

This ensures that after the pick-up arm has been returned by a movement in the first direction, the pick-up arm is positioned in the rest position in a direct and stable manner.

Moving the pick-up arm again in the second direction towards the turntable is possible only after a deliberate starting operation, i.e. a movement of the coupling portion of the control element from the first path to the second path.

It is to be noted that it is known from U.S. Pat. No. 3,848,875 to guide the coupling portion of a control element in such a way that coupling is obtained in a specific part of the path. However, in that case there is no question of two paths which are spaced from each other and which are concentric with the axis of the pick-up arm spindle, so that the risk of re-coupling in the rest position still exists.

In a suitable embodiment of the invention resilient means are provided by which the coupling portion of the control element is movable from an end point of the second path to a point in the first path. The resilient means ensure that, when the end point of the second path is reached during the movement of the control element in the second path, the control element is always moved into the first path. In this way it is achieved that after disengagement of the two coupling portions the coupling portions cannot erroneously engage again.

In this preferred embodiment it is of advantage if the control element is pivotably connected to the rod and the resilient means tend to pivot the control element with the coupling portion relative to the rod.

This results in a simple reliably operating construction which is capable of effecting the disengagement of the coupling portions in an effective manner.

In this embodiment it is also advantageous if the coupling portion of the control element is pivotably connected to the other portion of the control element and the resilient means are arranged between the coupling portion and the rod.

Thus, after the pick-up arm has completed the movement in the second direction, the two coupling portions can readily disengage owing to the pivotal movement of the coupling portion of the control element.

In this respect it is advantageous if the guide means are constituted by at least one arcuate ridge which is concentric with the pick-up arm spindle. The sides of this ridge constitute simple easy-to-mount guide means.

In view of the foregoing it is of advantage if a first arcuate ridge partially defines a sector of circle and a second arcuate ridge is situated entirely within said sector, the first and the second path being respectively defined by one of the sides of the ridges which face towards each other and by one of the sides which face away from each other.

The ridges may, for example, be provided in a simple yet accurate manner by injection-moulding if the ridges are integral with the frame.

In a further embodiment of the invention displacement means are provided by which the coupling portion of the control element is movable from an end point of the first path to a starting point of the second path. Thus, the coupling portions of the control element and the pick-up arm lever can be coupled only after performing a deliberate operation, namely the actuation of the displacement means.

In order to enable the control element to be moved from the first path into the second path by the displacement means it is preferred that the displacement means comprise a starting spring which is movable relative to the control element and whose force is greater than the force of the said resilient means.

In this respect, it is found to be advantageous if the displacement means further comprise a starting lever which is pivotable against spring force into a latched position, in which position the starting spring presses against the control element.

In order to enable the control element to return into the first path a preferred embodiment of the invention is characterized in that after the coupling portion of the control element has moved into the second path the starting lever can be released from the latched position by the rod.

The invention will now be described in more detail with reference to the drawings, which show some embodiments to which the invention is not limited.

DESCRIPTION OF THE PREFERRED EMBODIMENTS

Figure 1:
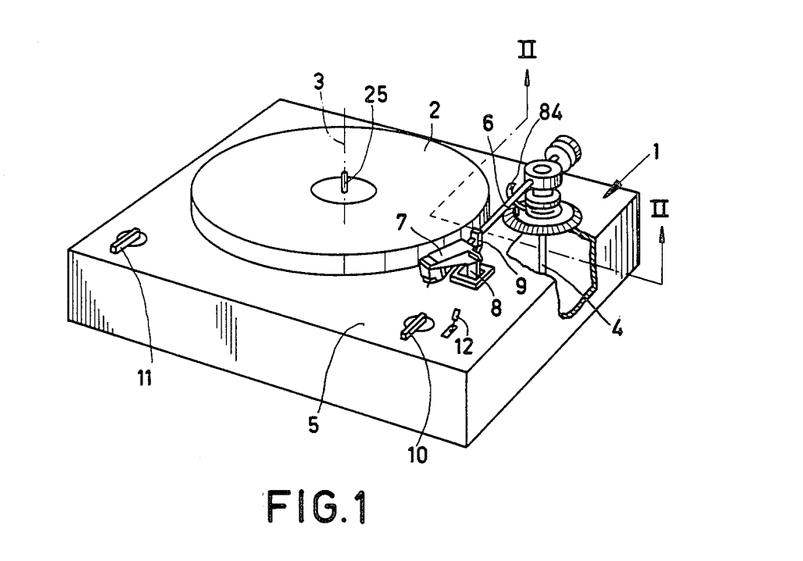
FIG. 1 is a perspective view of a record player in accordance with the invention.

The record player shown in FIG. 1 comprises a frame 1 on which a turntable 2 is mounted for rotation about an axis 3. A pick-up arm spindle 4 is journalled in the frame 1, which spindle extends through a deck plate 5 of the frame 1 and is rigidly connected to a pick-up arm 6. The pick-up arm spindle 4 extends substantially parallel to the axis of the rotation 3 and at right angles to the deck plate 5. A pick-up element 7 is secured to the pick-up arm 6. In the rest position of the pick-up arm 6, shown in FIG. 1, the pick-up arm is situated on a support 8. The pick-up arm can be secured to the support 8 by means of a latch 9.

On the deck plate 5 of the frame 1 there are arranged a number of control elements which are usually provided for controlling the record player, such as a control knob 10 for starting and stopping the record player operation and a control knob 11 for selecting the speed of rotation of the turntable and at the same time setting the position to which the pick-up arm 6 is automatically moved in a manner to be described hereinafter. There is further provided an actuating lever 12 on the deck plate, by means of which lever the pick-up arm 6 can be lifted or lowered relative to the turntable 2.

Figure 2:
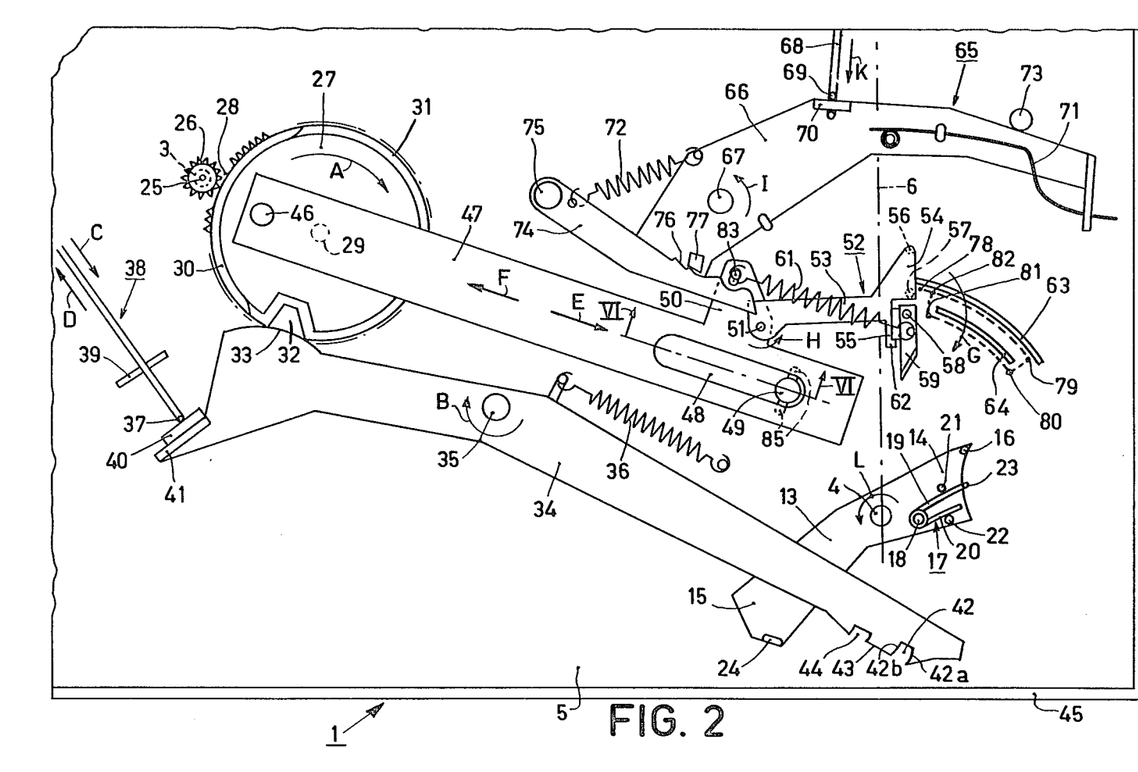
FIG. 2 is a bottom view, taken on the line II—II in FIG. 1, of those record player parts which are relevant to the invention, the control disc being in the rest position.
Figure 3:
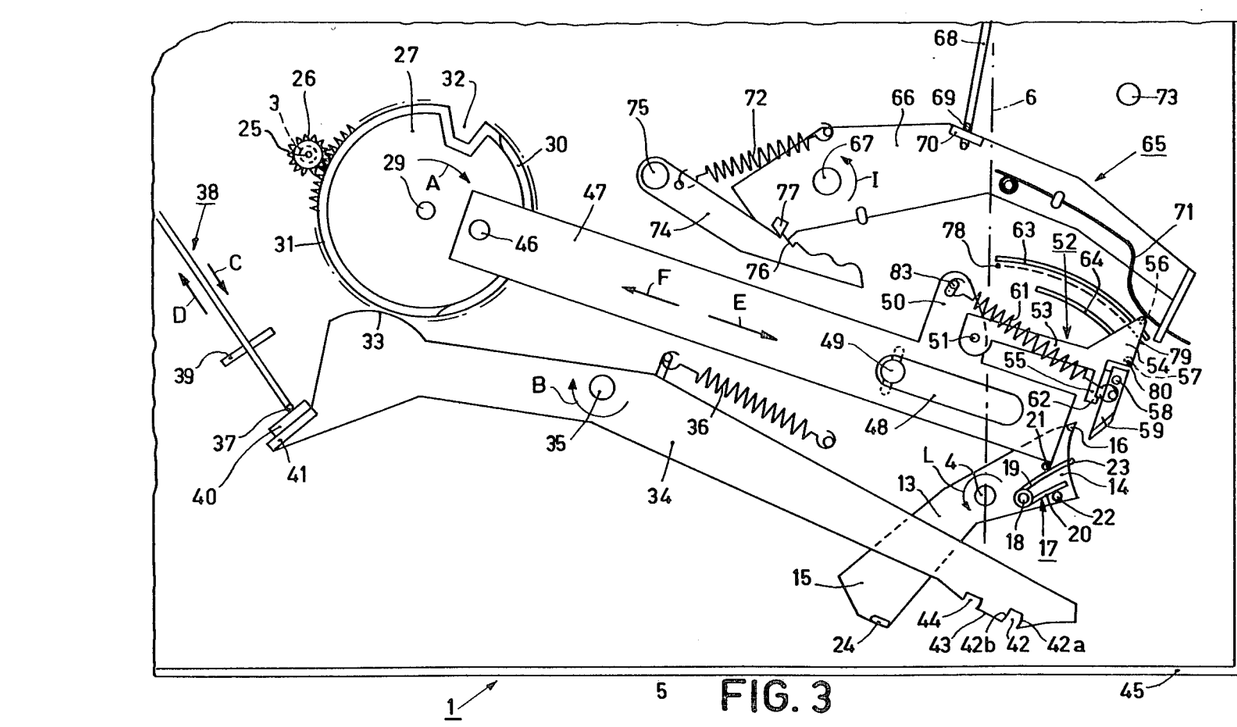
FIG. 3 is a bottom view similar to FIG. 2 but showing a situation in which the starting lever has been pivoted into the locked position, the control disc has been rotated through approximately 180° and the pick-up arm is still in the rest position.

As is shown in FIG. 2, the pick-up arm spindle 4 is rigidly connected to a pick-up arm lever 13 underneath the deck plate 5. In FIG. 2 these parts are shown in the position corresponding to the rest position of the pick-up arm 6. The pick-up arm lever 13 of the control mechanism for controlling the pick-up arm 6, like most of the parts to be described hereinafter, is preferably made of a plastic and extends substantially parallel to the deck plate 5. The pick-up arm lever 13 comprises a first portion 14 and a second portion 15. Near its free end the portion 14 comprises a coupling portion or tab 16 which extends substantially parallel to the axis of rotation 3 and constitutes a coupling portion, whose function is to be described in more detail hereinafter. Also mounted on the portion 14 is a torsion spring 27 having turns arranged around a pin 18 which is integral with the portion 14. The spring 17 comprises limbs 19 and 20 which press against abutments 21 and 22 provided on the portion 14, the limb 19 comprising a free end portion 23 which extends substantially parallel to the axis of rotation 3 over some distance and which also constitutes a coupling portion whose function is to be described in more detail hereinafter.

Near its free end the second portion 15 of the pick-up arm lever 13 comprises a finger 24 which extends substantially parallel to the axis of rotation 3 and whose function will also be described in more detail hereinafter.

In a manner not shown, the frame 1 carries a drive motor for driving the turntable 2. By means of the control knob 10 the motor can be started or stopped, thereby the bringing the turntable 2 into rotation or to a standstill respectively. By means of the control knob 11, in a manner not shown, the speed of the turntable can be set to 33 or 45 revolutions per minute, as required. When the turntable 2 is driven, a spindle 25 which is rigidly connected to the turntable 2 is also made to rotate, the central axis of said spindle coinciding with the axis of rotation 3. Underneath the deck plate 5 the spindle 25 carries a gear wheel 26. The gear wheel 26 can drive a toothed control disc 27, the transmission ratio being such that during driving the disc 27 rotates far more slowly than the gearwheel 26. Through the rotation of the control disc 27 the pick-up arm 6 can be controlled relative to the turntable 2. The teeth of the disc 27 are interrupted by a gap 28 where there are no teeth so that in a rest position, as shown in FIG. 2 the disc 27 is not driven by the gear wheel 26. Coupling means (not shown) are provided which are known per se and consequently do not fall within the scope of the invention and which are adapted to establish a coupling between the disc 27 and the gearwheel 26 so that the disc 27 is rotated through an angle such that the gear wheel 26 meshes with the teeth of the disc 27. The gear wheel 26 then rotates the disc 27 about a shaft 29 in the direction of arrow A (see FIGS. 2-5).

Underneath the teeth the disc 27 comprises an arcuate ridge 30 which is concentric with the shaft 29 and is situated adjacent the gap 28 and which preferably extends through an arc of approximately 120°. The ends of the ridge 30 adjoin a part-cylindrical wall 31 which is also concentric with the shaft 29 and whose axial dimension is approximately twice the axial dimension of the ridge 30. A recess 32 is formed in the wall 31 at approximately 270° from the gap 28, measured in the direction of the arrow A. In the rest position of the disc 27 an arcuate sliding surface 33 formed on an adjusting lever 34 is at least partly situated in the recess 32. Th sliding surface 33 prevents an undesired rotation of the disc 27 out of the rest position.

The lever 34 is pivotable about a shaft 35, a spring 36 tending to pivot the lever 34 in the direction of arrow B in FIG. 2. The spring 36 thus ensures that in the rest position of the disc 27 the lever 34 occupies the rest position shown in FIG. 2. The sliding surface 33 of the lever 34 is so positioned in the axial direction relative to the teeth of the disc 27 that upon rotation of the disc 27 the sliding surface 33 slides along the wall 31 and then moves in the direction of the arrow B towards the shaft 29 owing to the smaller axial dimension of the ridge 30. The latter movement can be limited by a stop which is constituted by an end portion 37 of a rod 38, which end portion 37 extends substantially parallel to the axis of rotation 3. The rod 38 is coupled to the control knob 11, the end portion 37 being movable between abutments 39 and 40, which are integral with the deck plate 5, in a direction represented by an arrow C and an arrow D respectively in FIG. 2. In the position shown in FIG. 2 the control knob 11 has been set to a turntable speed of 45 revolutions per minute, the stop portion 37 engaging with the abutment 40. In this position a stop surface 41 of the lever 34 is clear of the stop portion 37 of the rod 38. In this position of the lever 34 a recess 42 in the lever 34 at that end of the lever 34 which is remote from the sliding surface 33 can receive the finger 24 when the pick-up arm lever 13 is pivoted. This pivotal movement of the pick-up arm is effected in manner to be described hereinafter as the result of the rotation of the disc 27. In this pivoted position of the pick-up arm lever 13, shown in FIG. 4, the pick-up arm is in the correct set-down position for playing a 17-cm diameter, 45-rp.m record. For a correct guidance of the finger 24 into the recess 42 a wall 42a of the recess has an arcuate shape which is concentric with the shaft 35, a wall 42b extending obliquely inwards. The recess 42 is separated from a correspondingly shaped recess 44, which is disposed at a smaller distance than the recess 42 from the pivotal axis 35, by a surface portion 43 of the lever 34 on which the finger 24 can slide. The recess 44 serves for receiving the finger 24 in the position of the pick-up arm position for playing a 30- cm, 33-rpm record. To move the finger 24 into the recess 44, the rod 38 has to be moved in a manner not shown in the direction of the arrow D by actuating the control knob 11, after which, by pivotal movement in the direction of the arrow B, the free end of the lever 34 is moved against a stop constituted by an upright wall 45 of the frame 1 as a result of the force of the spring 36.

On the underside of the control disc 27, relative to the deck plate 5 there is arranged near the gap 28 a spindle 46 to which a connecting rod 47 is pivotably connected. The rod 47 is formed with a slot 48 through which a pin 49 passes. In the position of the connecting rod shown in FIG. 2 the pin 49 is situated near that end of the slot 48 which is remote from the spindle 46, while after rotation of the disc 27 through approximately 180° in the direction of the arrow A the pin 49 is situated near that end of the slot 48 which is nearer the spindle 46 (see FIG. 3). Thus the connecting rod 47 is movable between two end positions in the directions of the arrows E and F in FIG. 2 by rotation of the disc 27. The connecting rod 47 comprises a laterally projecting portion 50 at the location of the slot 48. A spindle 51 is secured to the portion 50, which spindle extends substantially parallel to the axis of rotation 3 and pivotally connects a control element 52 to the connecting rod 47. The control element 52 comprises an arm 53 which extends from the spindle 51 and at its end which is remote from the spindle 51 adjoins two limbs 54 and 55 of the control element. The limb 54 is provided with two pins 56 and 57 which extend towards the deck plate 5 substantially parallel to the axis of rotation 3. The limb 55, which relative to the limb 54 is situated at a shorter distance from the pick-up arm spindle 4, is provided with a spindle 58 at its end which is remote from the deck plate 5, which spindle also extends substantially parallel to the axis of rotation 3. By means of the spindle 58 a coupling portion 59, which forms part of the control element 52, is pivotally connected to the arm 53.

The coupling portion 59 extends from the spindle 58 substantially towards the pick-up arm spindle 4 and constitutes a pawl which, in a manner to be described hereinafter, can be coupled to the tab 16 of the pick-up arm lever 13. Between the coupling portion 59 and the laterally projecting portion 50 of the connecting rod 47 there is arranged a spring 61, which tends to pivot the coupling portion 59 about the spindle 58 in the direction of arrow G in FIG. 2, the pivotal movement being limited by a stop 62 on the limb 55. The spring 61 constitutes resilient means which also tend to pivot the control element 52 with the coupling portion 59 relative to the connecting rod 47 about the spindle 51 in the direction of arrow H in FIG. 2.

In the position shown in FIG. 2 the pivotal movement of the control element 52 is limited by an end portion of an arcuate first ridge 63 which is concentric with the pick-up arm spindle 4, the pin 57 being urged against the side of the ridge 63 which faces the pick-up arm spindle 4. Relative to the pick-up arm spindle 4 the ridge 63 partially defines a sector of a circle, a second ridge 64 being situated entirely within said sector and thus at a shorter distance from the pick-up arm spindle 4. In the embodiment shown the ridges 63 and 64 are preferably manufactured integrally with the deck plate 5 by injection molding. However, it is alternatively possible to arrange the ridges 63 and 64 on a support which is secured to the underside of the plate 5. The ridges 63 and 64, which are thus supported by the frame 1, constitute guide means for guiding the control element 52 during the rotation of the control disc 27 in the direction of the arrow A. By means of the ridges 63 and 64, in a manner to be described hereinafter, the coupling portion 59 of the control element 52 can be guided in a first path or a second path concentric with the pick-up arm spindle 4, the first path being situated at a greater radial distance from the pick-up arm spindle than the second path. The direction in which the pick-up arm 6 is moved about the axis of the spindle 4 away from or towards the turntable determines which path is followed.

In order to enable the coupling portion 59 to be moved from an end point of the first path to a starting point of the second path, displacement means 65 are provided on the underside of the deck plate 5, which means comprise a starting lever 66 which is connected to the deck plate 5 so as to be pivotable about a spindle 67. The starting lever 66 is coupled to a rod 68, which comprises a coupling portion 69 which extends substantially parallel to the axis of rotation 3. This coupling portion 69 presses against a lug 70 on the starting lever 66. Near a center portion of the starting lever 66 a wire starting spring 71 is secured to the starting lever, which spring is slightly bent towards the ridge 63 at some distance from the point at which the spring is secured to the lever 66. The end portion of the spring 71 which adjoins the bent portion thereof is so situated that by pivoting the starting lever 66 the end portion of the spring is movable to a position near the right-hand end of the ridge 63 in FIG. 2. By means of a spring 72 the starting lever 66 is pivoted about the spindle 67 in the direction of the arrow I in FIG. 2 and is urged against a stop 73 which is fixed to the deck plate 5. In this position the end portion of the starting spring 71 is situated at an ample distance from the ridge 63. At its end which is remote from the starting lever 66 the spring 72 is secured to a latching lever 74, which is pivotable about a spindle 75, the spring 72 tending to pivot the latching lever 74 about the spindle 75 in the direction of the arrow J in FIG. 4. Near its end which is remote from the spindle 75 the latching lever 74 comprises a plurality of latching cam protrusions 76, which are adpated to co-operate with a latch pin 77 which is secured to the starting lever 66.

Control of the pick-up arm during the start cycle and the stop cycle respectively is described hereinafter.

I. START CYCLE

The rod 68 is coupled to the control knob 10 in a manner not shown. By means of the control knob 10 the rod 68 is moved in the direction of the arrow K in FIG. 2. As a result of this the coupling portion 69 presses against the lug 70 and the starting lever 66 is pivoted in a direction opposite to that of the arrow I in FIG. 2 into the position shown in FIG. 3. In this position the pin 77 is latched behind one of the cam protrusions 76. Owing to this pivotal movement of the starting lever 66 the end portion of the starting spring 71 has been moved into the immediate vicinity of the right-hand part of the ridge 63. Simultaneously with the actuation of the control knob 10 the drive motor of the record player is started, the gear wheel 26 is caused by coupling means, not shown, to mesh with the disc 27 and the disc 27 is rotated in the direction of the arrow A.

As a result of this rotation of the disc 27 the connecting rod 47 is moved in the direction of the arrow E, so that the pin 57, starting from a point which is designated by the reference numeral 78 in FIG. 2, follows an arcuate first path, represented by a broken line, which is substantially concentric with the pick-up arm spindle 4 and is situated between the ridges 63 and 64. During the movement of the connecting rod 47 in the direction of the arrow E, in a manner to be described hereinafter, the pick-up arm 6 is automatically lifted relative to the deck plate 5 in an axial direction relative to the turntable 2, so that the pick-up arm is raised clear of the support 8. The pin 57 follows the first path from point 78 until the pin, after rotation of the disc 27 through approximately 180°, arrives at an end point indicated by the reference numeral 79 in FIG. 3. At this point of the path the end portion of the starting spring 71 presses against the pin 56 with a force which is greater than the force of the spring 61 with the result that the starting spring 71 tends to pivot the control element 52 in a direction opposite to that of the arrow H. As the ridge 64 has a smaller length of arc than the ridge 63, the control element 52 can be pivoted at point 79 under the influence of the pressure of the starting spring 71. The pin 57 then moves in a substantially radial direction relative to the pick-up arm spindle 4 from point 79 to a starting point 80 of the second path, which point is situated near that side of the ridge 64 which faces the pick-up arm spindle 4. Upon further rotation of the disc 27 in the direction of the arrow A, the coupling tab and portion 16 and 59 are coupled, which coupling is possible in that the coupling portion 59, during the transfer to the second path, reaches a position which is situated at a smaller radial distance from the pick-up arm spindle. Further rotation of the disc 27 results in the pick-up arm lever 13 being pivoted in the second direction, indicated by an arrow L in FIG. 3.

Figure 4:
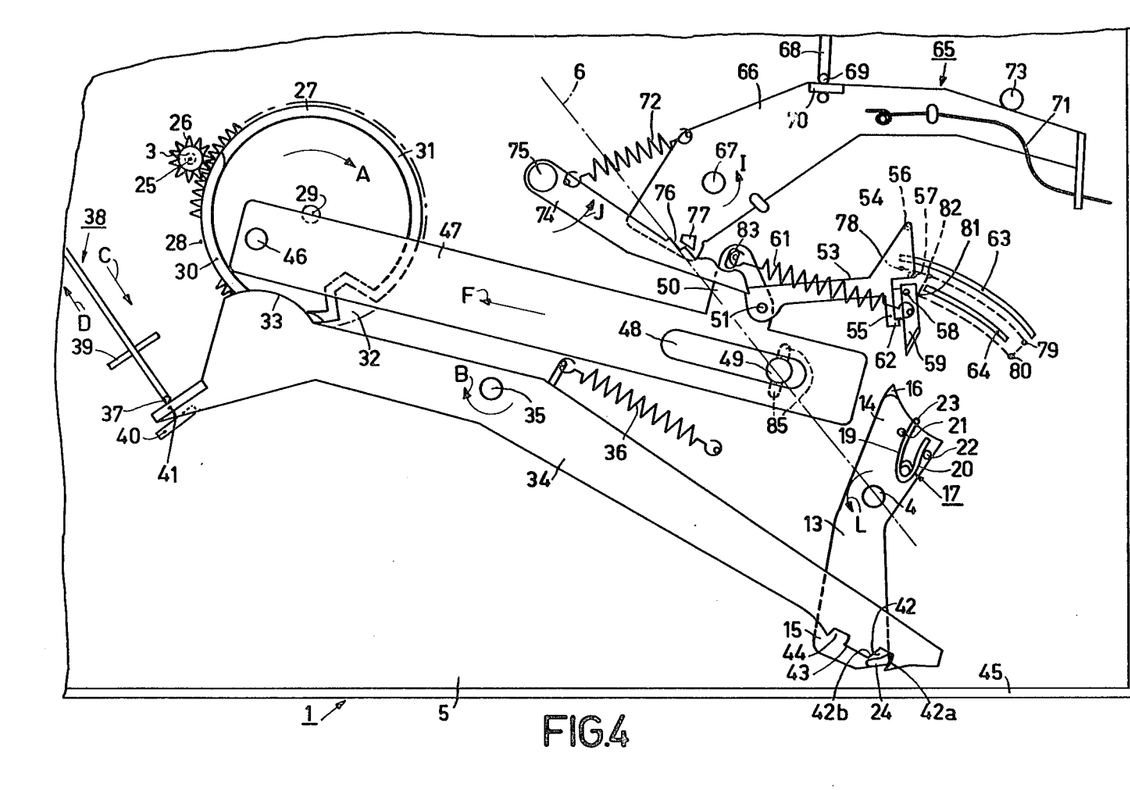
FIG. 4 is a bottom view similar to FIG. 2 but showing the control disc rotated through approximately 315° and the pick-up arm pivoted relative to the turntable into a set-down position.

During rotation of the disc 27, as already described in the foregoing, the lever 34 is pivoted in the direction of the arrow B after having reached the ridge 30, so that depending on the setting of rod 38 the recess 42 or 44 is positioned at a location in which it can act as a stop for the pivotal movement of the pick-up arm lever 13. As already stated in the foregoing, FIGS. 2-5 represent a setting for a 17-cm, 33-rpm record for which the recess 42 is operative. A broken line in FIG. 4 shows how the pin 57, after rotation of the control disc through approximately 315°, has passed a point 81 which constitutes an end point of the second path and which is situated near the end of the second ridge 64. Under the influence of the resilient means constituted by the spring 61, the control element 52 is subsequently pivoted in the direction indicated by the arrow H, so that the pin 57 is moved up to a point 82 in the first path, situated near the end point 78. As is shown in FIG. 4, the finger 24 engages in the recess 42 in this position as a result of the pivotal movement of the pick-up arm lever 13 in the direction of the arrow L. Owing to the shape of the walls 42a and 42b of the recess 42 the pick-up arm position is defined exactly. This provides an accurate set-down position of the pick-up arm 6 relative to the record on the turntable 2.

During the movement of the pin 57 along the second path between points 80 and 81, a pin 83 on the laterally projecting portion 50, as is shown in FIG. 4, moves against the end of the latching lever 74 owing to the movement of this connecting rod 47 in the direction of the arrow F, the pin 83 tending to pivot the latching lever 74 in a direction opposite to that of the arrow J. As a result of this the pin 77 is released from its latched position behind the previously engaged cam protrusion 76, so that by means of the spring 72 the starting lever 66 is pivoted in the direction of the arrow I. Thus, the starting spring 71 is returned to the rest position at an ample distance from the ridge 63.

Figure 6:
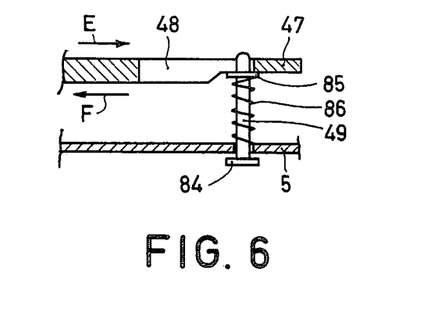
FIG. 6 is a cross-sectional view on an enlarged scale, taken on the line VI—VI in FIG. 2.

As stated previously, a mechanism is provided to enable the pick-up arm 6 to be lifted or lowered in an axial direction relative to the turntable 2. For this purpose the pin 49 is arranged so as to be movable in a direction perpendicular to the deck plate 5. The pin 49 projects beyond the deck plate 5 and is connected to an arcuate support 84, which is substantially concentric with the pick-up arm spindle 4 (see FIGS. 1 and 6). Underneath the deck plate 5, the pin 49 is provided with two radial projections 85 which are urged against the top of the connecting rod 47 by a spring 86. Adjacent the slot 48 the connecting rod 47 is formed with a ramp surface which rises in the direction of the spindle 46 and is such that in the position of the connecting rod 47 shown in FIGS. 2 and 6 the support 84 is in lowest position relative to the deck plate 5. In this position the support 84 is spaced from the underside of the pick-up arm 6. When the connecting rod 47 moves in the direction of the arrow E, the projections 85 are lifted towards the deck plate 5 by the ramp surface of the connecting rod 47 against the pressure of the spring 86, which results in an upward movement of the support 84 relative to the deck plate 5. This upward movement results in the support 84 lifting the pick-up arm 6, so that the pick-up arm 6 and the pick-up element 7 are entirely clear of the turntable 2 during control by the control disc 27. Starting from the position of the connecting rod 47 shown in FIG. 4, in which the pin 57 of the control element 52 is situated at point 82 in the first path, the ramp surface of the connecting rod, upon a further movement of the pin 57 in the direction of the starting point 78 of the first path, is moved relative to the projections 85 as a result of the movement of the connecting rod 47 in the direction of the arrow F, and the projections 85 and the pin 49 are moved in a downward direction relative to the deck plate 5 under the influence of the spring 86. As a result of this, the support 84 and thus the pick-up arm 6 is lowered, so that the pick-up element 7 comes into contact with a record which is placed on the turntable 2. In this position the pick-up arm 6 is again entirely clear of the support 84, as in the rest position.

During the movement of the pin 57 from point 82 to the starting point 78 of the first path the lever 34 is pivoted in a direction opposite to that of the arrow B, because the sliding surface 33 again comes into contact with the wall 31, so that the finger 24 is disengaged from the recess 42. Thus, when the control disc 27 has again reached the rest position, the pick-up arm lever 30 is entirely clear of the lever 34. The sliding surface 33, which is again in contact with the recess 32, prevents an undesired rotation of the disc 27. After disengagement of the pick-up arm lever the pick-up arm can now move freely relative to the turntable 2 for playing the record.

II. STOP CYCLE

Figure 5:
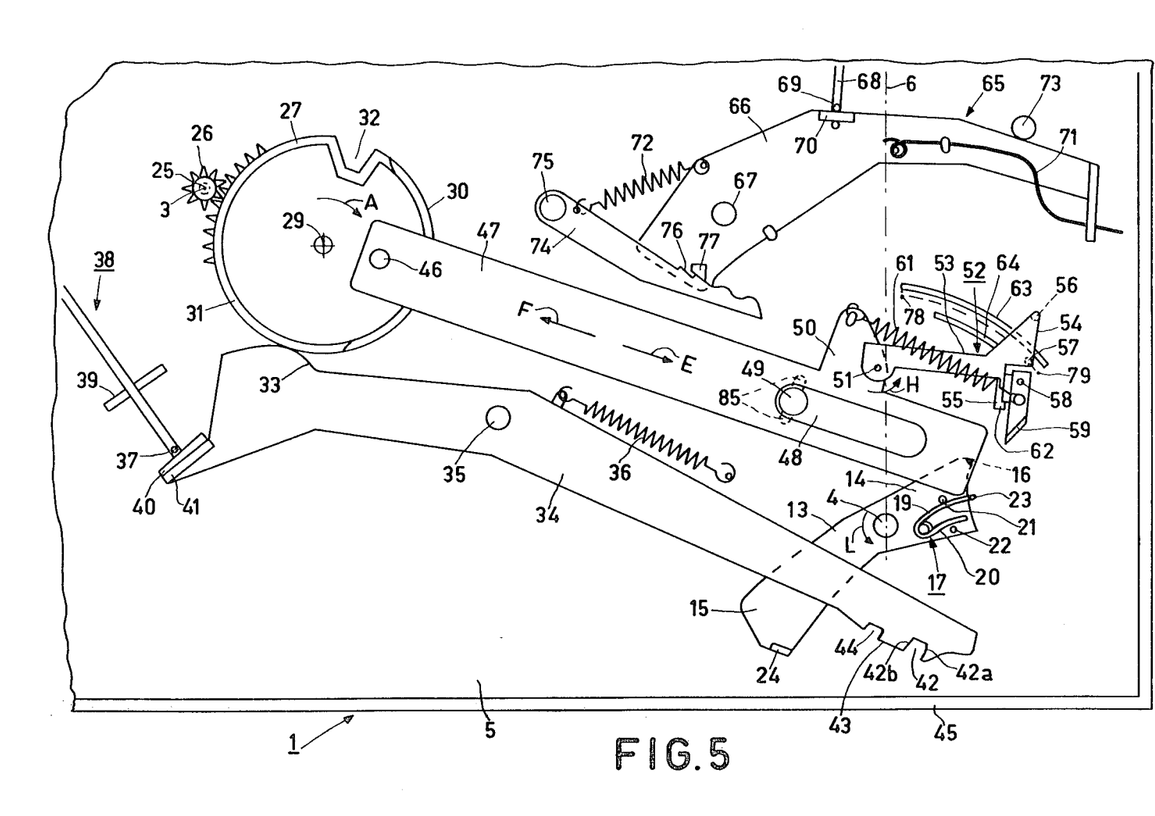
FIG. 5 is a bottom view similar to FIG. 2 but showing the control disc rotated through approximately 180° and the pick-up arm returned to the rest position.

When the stylus of the pick-up element 7 has arrived in the lead-out groove near the center portion of the record, the coupling means, not shown, are actuated so that the gear wheel 27 again meshes with the teeth of the control disc 27. Subsequently, the control disc 27 again starts to rotate in the direction of the arrow A. The pin 57 is then moved from the starting point 78 in the first path to the end point 79. Owing to the ramp surface of the connecting rod near the slot 48 the pin 49 is raised so that the support 84 lifts the pick-up arm 6. The pick-up element 7 is thereby moved clear of the record on the turntable 2. The free end of the connecting rod 47, which is remote from the spindle 46, subsequently engages with the end portion 23 of the spring 17, so that as the connecting rod 47 moves further in the direction of the arrow E the pick-up arm lever 13 is pivoted in a direction opposite to that of the arrow L. This pivotal movement is not impeded because owing to the action of the wall 31 the recesses 42 and 44 in the lever 34 are situated a distance from the finger 24. The result of this is that after rotation of the control disc 27 through approximately 180°, as shown in FIG. 5, the pick-up arm 6 can again reach the rest position.

At this instant the pin 57 of the control element 52 has reached the end point 79 of the first path. Upon further rotation of the control disc 27 the connecting rod 47 subsequently returns in the direction of the arrow F. As a result of this, the pin 57 moves back in the direction of the starting point 78. As the spring 61 continuously tends to pivot the control element 52 in the direction of the arrow H, the pin 57 is forced to remain in the first path. Due to the action of the spring 72 the starting spring 71 is situated at an ample distance from the pin 56 and thus cannot influence the control element 52 in any way. Thus, its is ensured that the pin 57 moves from the end point 79 to the starting point 78 of the first path between the two ridges 63 and 64. Hence, it is impossible for the coupling portion 59, when the pick-up arm is returned to the rest position, erroneously to engage the coupling tab 16 of the pick-up arm lever 13.

A further rotation of the control disc 27 results in the pin 57 being moved back along the first path to the starting point 78. During the movement from point 82 to point 78 the pin 49 is again moved down, so that the pick-up arm 6 is lowered onto the support 8. Subsequently, the pin 57 will reach the starting point 78, while the disc 27 again disengages from the gear wheel 26 and the lever 34 again prevents the disc 27 from being rotated. Finally, the drive motor of the record player is automatically stopped in a manner not shown.

As a result of this, after being returned to a position above the support 8, through a movement in the first direction, the pick-up arm is placed in the rest position in a direct and stable manner.

Figure 7:
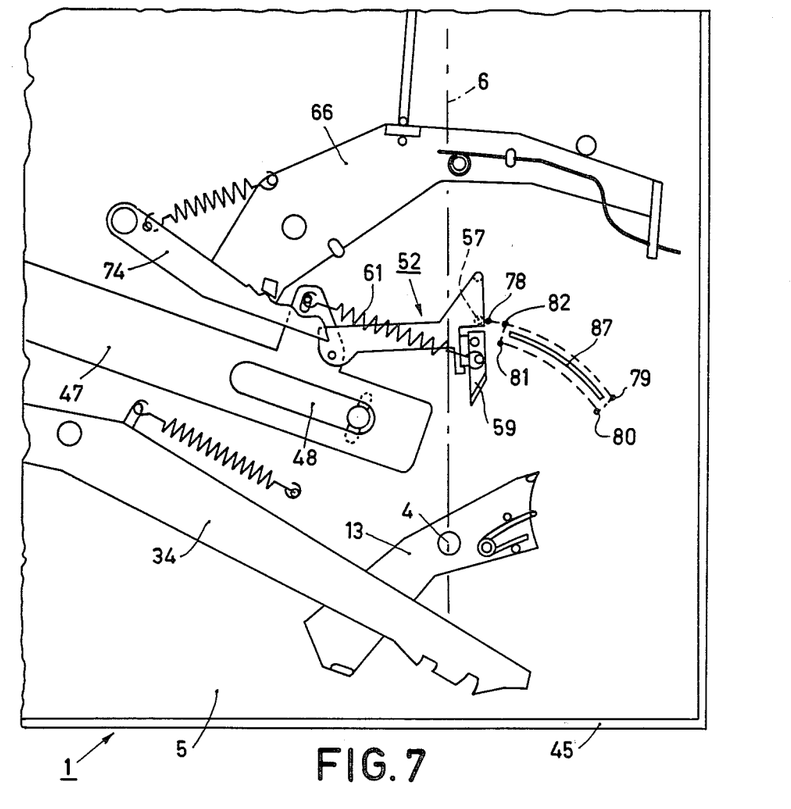
FIG. 7 is a bottom view of part of a second embodiment of a record player in accordance with the invention.

Instead of the two ridges 63 and 64 it is alternatively possible, as is shown in FIG. 7, to use only one ridge 87. The pin 57 is then moved during the starting cycle between points 78 and 79 in the first path along the side of the ridge 87 which faces away from the pick-up arm spindle 8. Subsequently, during control of the pick-up arm 6 in the second direction the pin 57 is moved between points 80 and 81 along the side of the ridge 87 which faces the pick-up arm 4. Under the influence of the spring 61 the pin is then guided from point 81, which in the present embodiment is situated near the end of the ridge 87, to point 82 in the first path, the pin finally being returned from point 82 to point 78. It is to be noted that in this embodiment, the location and force of the spring 61 relative to the control element 52 are such that the pin 57, despite the local absence of a guide wall, is steered along the first path between the points 78 and 82 and vice versa. During the stop cycle the pin 57 only travels along the first path between the points 78 and 79 and back.

Figure 8:
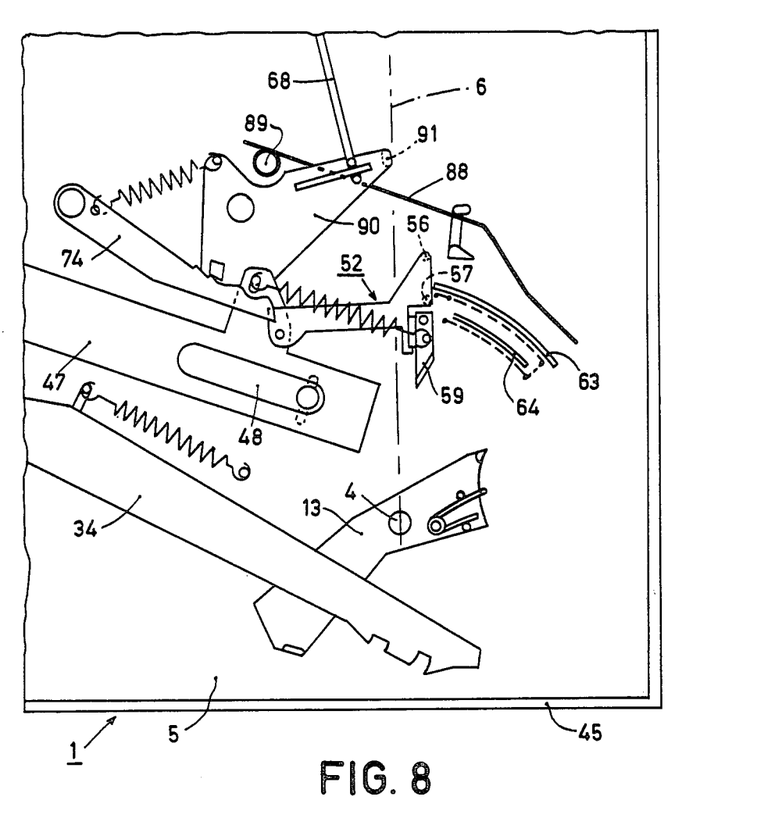
FIG. 8 is a bottom view of part of a third embodiment of a record player in accordance with the invention.

As is shown in FIG. 8, it is alternatively possible to provide a separate starting spring 88 on a spindle 89 on the underside of the deck plate 5 and to arrange it to be pivotable in such a way that, in a manner similar to that described in the foregoing, the spring 88 is moved against the pin 56 by moving a starting lever 90 on which a pawl 91 is provided.

Furthermore, it is to be noted that instead of the mechanical displacement means 65 shown it is possible to employ electro-magnetic or electrical displacement means, such as a relay which is adapted to press the pin 56 of the control element 52 in the direction of the pick-up arm spindle 4, if the pin 57 is to be moved from point 79 of the first path to point 80 of the second path in order to move the pick-up arm 6 in the second direction.

Apart from accurate control of the pick-up arm 6, the construction of an automatic record player as described in the foregoing furthermore has the advantage that, owing to the comparatively small number of components, assembly of the record player is simple and cheap. The large number of parts mounted on the deck plate 5, such as the ridges 63 and 64 as well as the various spindles and other projections, can be formed integrally with the frame 1 by injection-molding, thereby greatly simplifying assembly of the record player.

Moreover, this yields the advantage that the various components can initially be positioned very accurately relative to each other in a simple manner, so that adjustment of the various parts relative to each other is no longer necessary.

What is claimed is:

1. A record player having a frame (1) on which a turntable (2) is mounted for rotation and in which a pick-up arm spindle (4) is journalled; a pick-up arm (6) and a pick-up arm lever (13) connected to said spindle; a control member (27) carried on the frame by which the pick-up arm can be controlled in a first direction of movement about the axis of the spindle away from the turntable and in a second direction of movement about the axis of the spindle towards the turntable; a rod (47) connected to the control member; a control element (52) which cooperates with said rod and which comprises a coupling portion (59) which, at least for controlling the pick-up arm in the second direction of movement, is engageable with a coupling portion (16) of the pick-up arm lever, characterized in that the frame (1) carries guide means (63, 64; 87) for the control element (52), arranged such that when the pick-up arm (6) is controlled in the first or the second direction of movement, said guide means guide the coupling portion (59) of the control element over a first and a second path respectively, which paths are substantially concentric with the axis of the pick-up arm spindle (4), the first path being situated at a greater radial distance from said axis than the second path, and the coupling portion of the control element being engageable with the coupling portion (16) of the pick-up arm lever (13) in the second path only.

2. A record player as claimed in claim 1, characterized in that the player comprises resilient means (61) by which the coupling portion (59) of the control element (52) is movable from an end point (81) of the second path to a point (82) in the first path.

3. A record player as claimed in claim 2, characterized in that the control element (52) is pivotably connected to the rod (47), and the resilient means (61) tend to pivot the control element with the coupling portion (59) relative to the rod (47).

4. A record player as claimed in claim 3, characterized in that the coupling portion (59) of the control element (52) is pivotably connected to another portion of the control element and the resilient means (61) are arranged between the coupling portion and the rod (47).

5. A record player as claimed in any one of the preceding claims 1-4, characterized in that the guide means are constituted by at least one arcuate ridge which is concentric with the pick-up arm spindle (63, 64; 87).

6. A record player as claimed in claim 5, characterized in that said at least one ridge includes a first arcuate ridge (63) which partially defines a sector of circle and a second arcuate ridge (64) which is situated entirely within said sector, the first and the second path being respectively defined by one of the sides of the ridges which face towards each other and by one of the sides which face away from each other.

7. A record player as claimed in claim 5, characterized in that each ridge (63, 64; 87) is integral with the frame (1).

8. A record player as claimed in claim 5, characterized in that the player comprises displacement means (65) for moving the coupling portion (59) of the control element (52) from an end point (79) of the first path to a starting point (80) of the second path.

9. A record player as claimed in claim 8, characterized in that the player comprises resilient means (61) by which the coupling portion (59) of the control element (52) is movable from an end point (81) of the second path to a point (82) in the first path, and that the displacement means (65) comprise a starting spring (71; 88) which is movable relative to control element (52) and whose force is greater than the force of said resilient means (61).

10. A record player as claimed in claim 9, characterized in that the displacement means (65) further comprise a starting lever (66; 90) which is pivotable against spring force into a latched position, in which position the starting spring (71; 88) presses against the control element (2).

11. A record player as claimed in claim 10, characterized in that the starting lever is arranged such that after the coupling portion (59) of the control element (52) has moved into the second path the starting lever (66; 90) can be released from the latched position by the rod (47).

* * * * *